United States Patent
Chen

(10) Patent No.: US 12,489,308 B2
(45) Date of Patent: Dec. 2, 2025

(54) POWER ADJUSTMENT DEVICE AND CHARGING SYSTEM

(71) Applicant: DARFON ELECTRONICS CORP., Taoyuan (TW)

(72) Inventor: Hsin-Hung Chen, Taoyuan (TW)

(73) Assignee: DARFON ELECTRONICS CORP., Taoyuan (TW)

(*) Notice: Subject to any disclaimer, the term of this patent is extended or adjusted under 35 U.S.C. 154(b) by 0 days.

(21) Appl. No.: 18/919,455

(22) Filed: Oct. 18, 2024

(65) Prior Publication Data

US 2025/0167578 A1    May 22, 2025

Related U.S. Application Data

(60) Provisional application No. 63/600,738, filed on Nov. 20, 2023.

(30) Foreign Application Priority Data

Jul. 10, 2024  (TW) .................. 113125842

(51) Int. Cl.
*H02J 7/00* (2006.01)
*H02J 1/08* (2006.01)
*H02J 7/34* (2006.01)

(52) U.S. Cl.
CPC ............ *H02J 7/00712* (2020.01); *H02J 1/08* (2013.01); *H02J 7/00032* (2020.01); *H02J 7/0013* (2013.01); *H02J 7/342* (2020.01); *H02J 2207/20* (2020.01)

(58) Field of Classification Search
CPC .... H02J 7/00712; H02J 7/00032; H02J 7/342; H02J 1/08; H02J 7/0013; H02J 2207/20
See application file for complete search history.

(56) References Cited

U.S. PATENT DOCUMENTS

2013/0334878 A1* 12/2013 Brabec .................. B60L 53/00
307/9.1
2017/0358996 A1* 12/2017 Higaki .................. H02M 1/38

* cited by examiner

Primary Examiner — Carlos Amaya
(74) Attorney, Agent, or Firm — Winston Hsu

(57) ABSTRACT

A charging system includes a first device; a second device; and a power adjustment device including a DC-to-DC conversion unit; and a micro-control unit for receiving a charging instruction, a first power information of the first device and a second power information of the second device and performing the following steps: controlling the DC-to-DC conversion unit to convert a first supply current received by the first device into a first charging current according to the first power information and the second power information when the charging instruction instructs the first device to charge the second device; and controlling the DC-to-DC conversion unit to convert a second supply current received by the second device into a second charging current according to the first power information and the second power information when the charging instruction instructs the second device to charge the first device.

4 Claims, 7 Drawing Sheets

POWER ADJUSTMENT DEVICE AND CHARGING SYSTEM

CROSS REFERENCE TO RELATED APPLICATIONS

This application claims the benefit of U.S. Provisional Application No. 63/600,738, filed on Nov. 20, 2023. The content of the application is incorporated herein by reference.

BACKGROUND OF THE INVENTION

1. Field of the Invention

The present invention relates to a power adjustment device and a charging system, and more particularly, to a power adjustment device and a charging system capable of executing bidirectional charging and discharging.

2. Description of the Prior Art

With the popularity of electric vehicles, light electric vehicles have also been emphasized, including electric-assisted bicycles, electric motorcycles, electric wheelchairs, or golf carts, and so on. Currently, the development of light electric vehicles is limited by the capacity of the batteries, so more batteries need to be paralleled to increase the capacity. For example, a light electric vehicle can have a master battery and one or more auxiliary batteries to increase the capacity range. However, currently, light electric vehicles can only charge the primary and auxiliary batteries via an AC charger and cannot charge the primary and auxiliary batteries directly from an external battery or other external power supply. In addition, the primary and auxiliary batteries of a light electric vehicle cannot directly provide power to charge an external battery or other external device.

Therefore, managing the power of the external device, the master battery, and the auxiliary battery, and controlling the execution of bidirectional charging and discharging of the external device, the master battery, and the auxiliary battery has become one of the goals of the industry.

SUMMARY OF THE INVENTION

Therefore, the purpose of the present invention is to provide a power adjustment device and a charging system to solve the above problems.

The present invention provides a charging system, comprising a first device; a second device; and a power adjustment device, wherein the power adjustment device comprises a direct current to direct current (DC-to-DC) conversion unit, coupled to the first device and the second device; and a microcontroller unit, coupled to the DC-to-DC conversion unit, the first device, and the second device, is configured to receive a charging command, a first power information of the first device and a second power information of the second device, and to perform the following steps: controlling the DC-to-DC conversion unit to convert a first supply current received by the first device into a first charging current to charge the second device according to the first power information and the second power information when the charging command instructs the first device to charge the second device; and controlling the DC-to-DC conversion unit to convert a second power supply current received by the second device into a second charging current to charge the first device according to the first power information and the second power information when the charging command instructs the second device to charge the first device.

The present invention provides a power adjustment device, for a first device and a second device, comprising a direct current to direct current (DC-to-DC) conversion unit coupled to the first device and the second device; and a microcontroller unit, coupled to the DC-to-DC conversion unit, the first device, and the second device, is configured to receive a charging command, a first power information of the first device, and a second power information of the second device, and to perform the following steps: controlling the DC-to-DC conversion unit to convert a first supply current received by the first device into a first charging current to charge the second device according to the first power information and the second power information when the charging command instructs the first device to charge the second device; and controlling the DC-to-DC conversion unit to convert a second power supply current received by the second device into a second charging current to charge the first device according to the first power information and the second power information when the charging command instructs the second device to charge the first device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
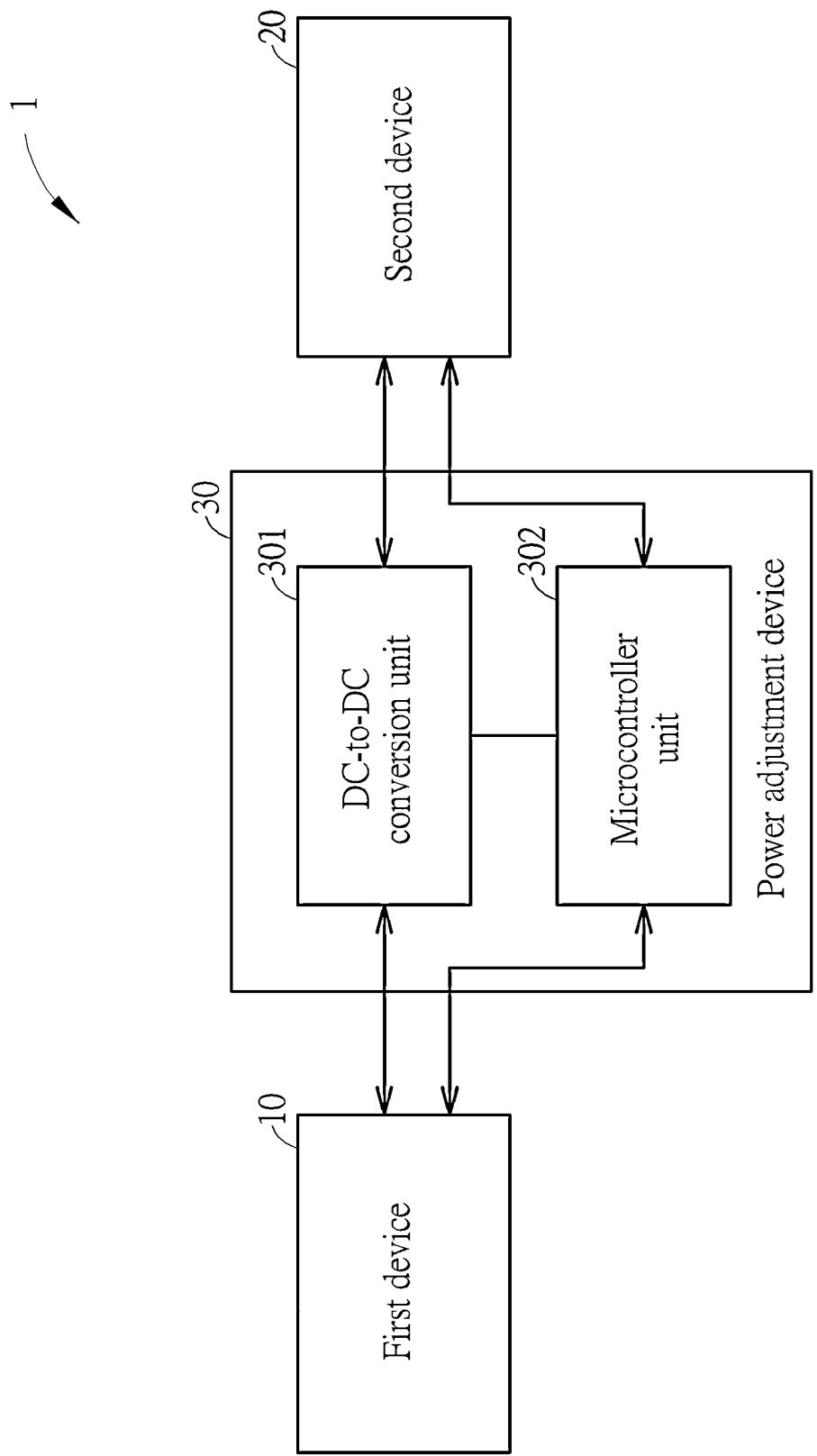
FIG. 1 is a schematic diagram of a charging system according to an embodiment of the present invention.

Please refer to FIG. 1. FIG. 1 is a schematic diagram of a charging system 1 according to an embodiment of the present invention. The charging system 1 includes a first device 10, a second device 20, and a power adjustment device 30. The power adjustment device 30 is coupled to the first device 10 and the second device 20 and is configured to control the discharge of the first device 10 to charge the second device 20 or control the discharge of the second device 20 to charge the first device 10. In detail, the power adjustment device 30 includes a DC-to-DC conversion unit 301 and a microcontroller unit 302. The microcontroller unit 302 is coupled to the first device 10, the second device 20, and the DC-to-DC conversion unit 301 to receive a charging command, a first power information of the first device 10, and a second power information of the second device 20. The charging command may instruct the first device 10 to discharge to charge the second device 20 or instruct the second device 20 to discharge to charge the first device 10. It should be noted that the charging command may be input by a user via a user interface (not shown in FIG. 1) or generated by a controller (not shown in FIG. 1) of the first device 10, the second device 20, or the power adjustment device 30, but is not limited thereto. In this way, the microcontroller unit 302 may perform the following steps: when the charging command instructs the first device 10 to charge the second device 20, controlling the DC-to-DC conversion unit 301 to convert a first supply current received by the first device 10 to a first charging current to charge the second device 20 according to the first power information and the second power information; and when the charging command instructs the second device 20 to charge the first device 10, controlling the DC-to-DC conversion unit 301 to convert a second supply current received by the second device 20 to a second charging current to charge the first device 10 according to the first power information and the second power information. In short, the first device 10 and the second device 20 may charge or discharge each other, i.e., bidirectional charging and discharging, by the power adjustment device 30 of the present invention.

It should be noted that FIG. 1 is an embodiment of the present invention, and those skilled in the art may make appropriate adjustments according to system requirements. For example, the charging system of the present invention may be applied to an electric-assisted bicycle, but is not limited thereto. As long as the charging system is applied to a charging system that requires a bidirectional charging and discharging function, the charging system of the present invention shall be within the scope of the present invention. For convenience of illustration, in the following embodiments, the charging system is applied to an electric-assisted bicycle.

Figure 2:
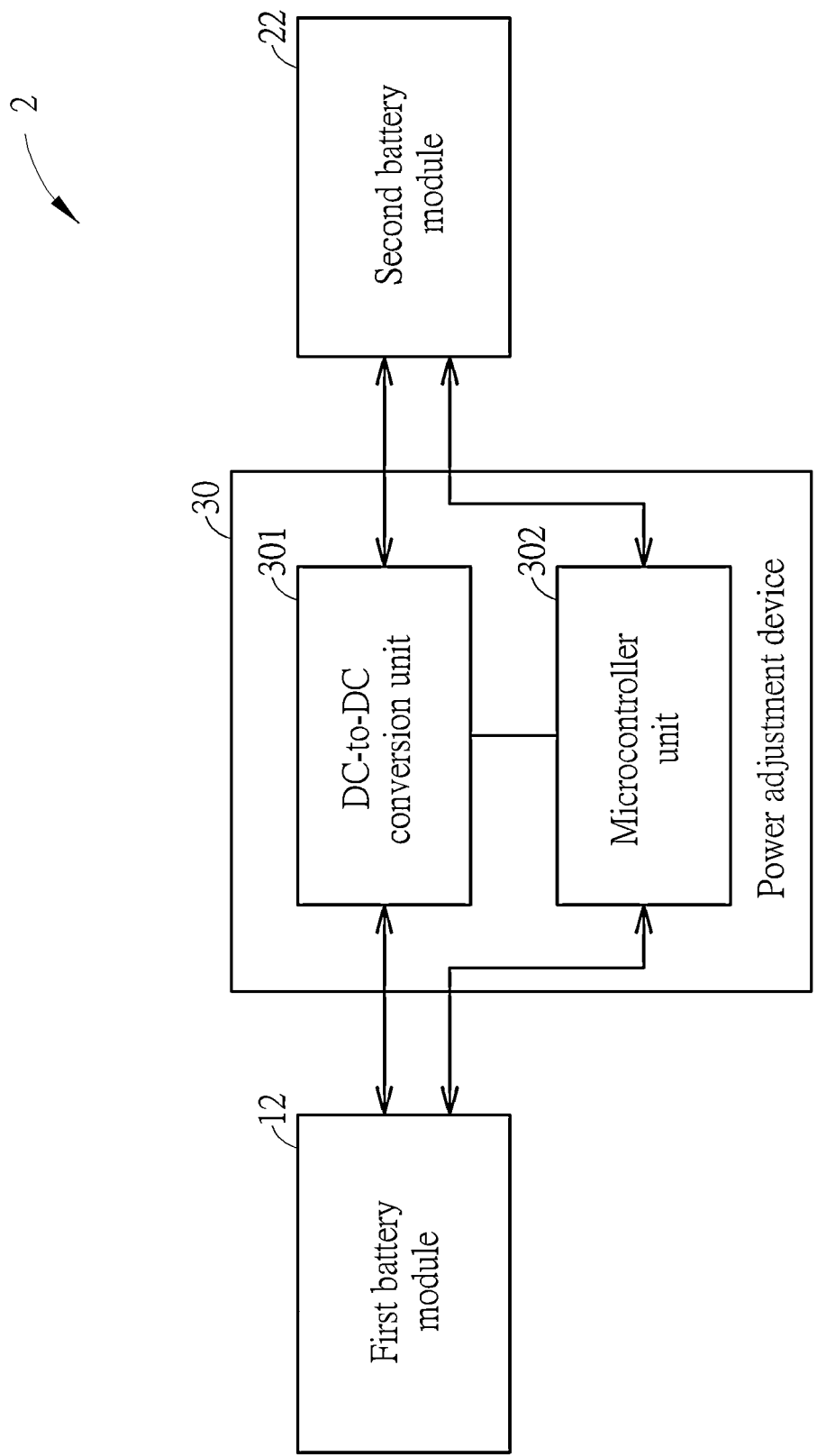
FIG. 2 is a schematic diagram of another charging system according to an embodiment of the present invention.

In an embodiment, please refer to FIG. 2, which is a schematic diagram of a charging system 2 according to an embodiment of the present invention. In the charging system 2, the first device 10 may be a first battery module 12, e.g., the master battery module of the electric-assisted bicycle, and the second device 20 may be a second battery module 22, e.g., the auxiliary battery module of the electric-assisted bicycle. The microcontroller unit 302 may communicate with the first battery module 12 and the second battery module 22 via a communication interface to receive the first power information and the second power information. The first power information may include a first battery voltage and a first battery current of the first battery module 12, and the second power information may include a second battery voltage and a second battery current of the second battery module 22, but is not limited thereto. Specifically, the microcontroller unit 302 may determine the battery capacity of the first battery module 12 and the battery capacity of the second battery module 22 according to the charging command, the first power information and the second power information, and further determine a charging power or a discharging power. In this way, the microcontroller unit 302 may control the first battery module 12 and the second battery module 22 to charge and discharge each other at the charging power or the discharging power. It should be noted that the communication interface may be an inter-integrated circuit (I$^2$C), a universal asynchronous receiver/transmitter (UART), or a controller area network (CAN), but not limited thereto. In addition, vehicle communication protocols such as an integrated bus circuit, a universal asynchronous receiver/transmitter, and a controller area network are well-known in the art and will not be repeated.

Figure 3:
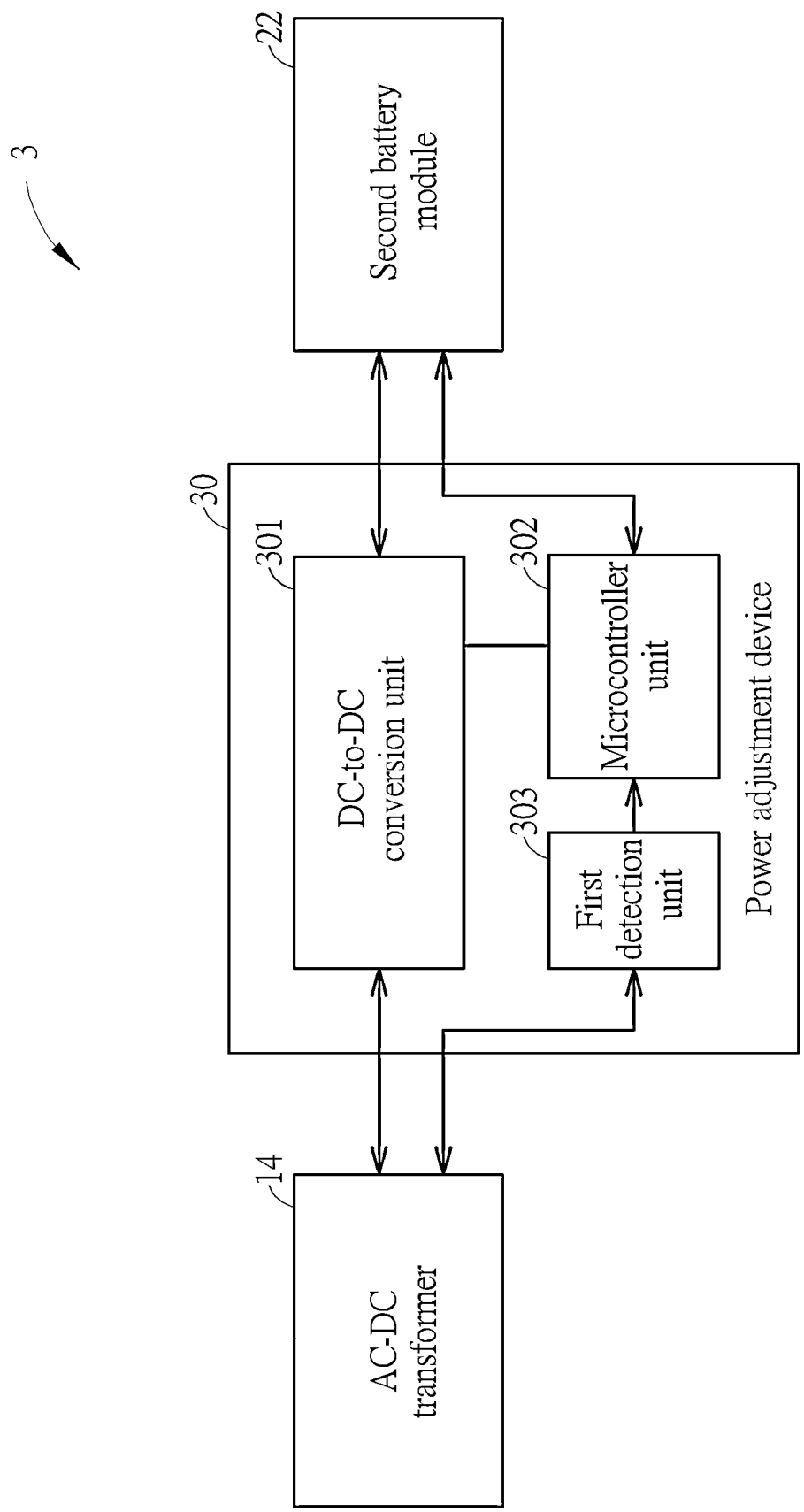
FIG. 3 is a schematic diagram of another charging system according to an embodiment of the present invention.

In another embodiment, please refer to FIG. 3, which is a schematic diagram of a charging system 3 according to an embodiment of the present invention. In the charging system 3, the first device 10 may be an AC-to-DC transformer 14, for example, a dedicated charger for an electric-assisted bicycle, or another charger complying with a Universal Serial Bus (USB) Power Delivery (PD) standard or a Quick Charge (QC) standard. The second device 20 may be a second battery module, e.g., a master battery module, an auxiliary battery module, or a combination of a master battery module and an auxiliary battery module for the electric-assisted bicycle. Specifically, suppose the AC-to-DC transformer 14 is a specialized charger for the electric-assisted bicycle. In that case, the microcontroller unit 302 may communicate with the AC-to-DC transformer 14 and the second battery module 22 via the communication interface to receive the first power information and the second power information. The first power information may include an output power of the AC-to-DC transformer 14, and the second power information may include a second battery voltage and a second battery current of the second battery module 22, but not limited thereto. On the other hand, if the AC-DC transformer 14 is not a dedicated charger for electric-assisted bicycles, the AC-DC transformer 14 may not have a communication function, i.e., the AC-DC transformer 14 does not provide the first power information to the microcontroller 302. Therefore, the power adjustment device 30 of the charging system 3 may further include a first detection unit 303 coupled between the AC-DC transformer 14 and the microcontroller 302. The first detection unit 303 may be configured to detect the first power information of the AC-to-DC transformer 14, such as an output power, but is not limited thereto. In this way, the microcontroller unit 302 may determine the charging power or the discharging power according to the first power information (output power) and the second power information, and control the charging of the second battery module 22 by the AC-to-DC transformer 14. On the other hand, the microcontroller unit 302 may transmit the second power information (second battery voltage and second battery current) of the second battery module 22 to the AC-to-DC transformer device 14. In this way, the AC-to-DC transformer device 14 may charge the second battery module 22 with a suitable input power according to the second power information. For example, the output voltage of a charger conforming to a common serial bus power transfer standard may be 5V, 9V, 15V, 20V, 28V, 36V, or 48V, and the charger may charge the second battery module 22 at an output voltage suitable for the second battery module 22. In short, the charging system 3 may avoid damage to the second battery module 22 caused by the AC-to-DC transformer 14 charging the second battery module 22 with an unsuitable specification.

Figure 4:
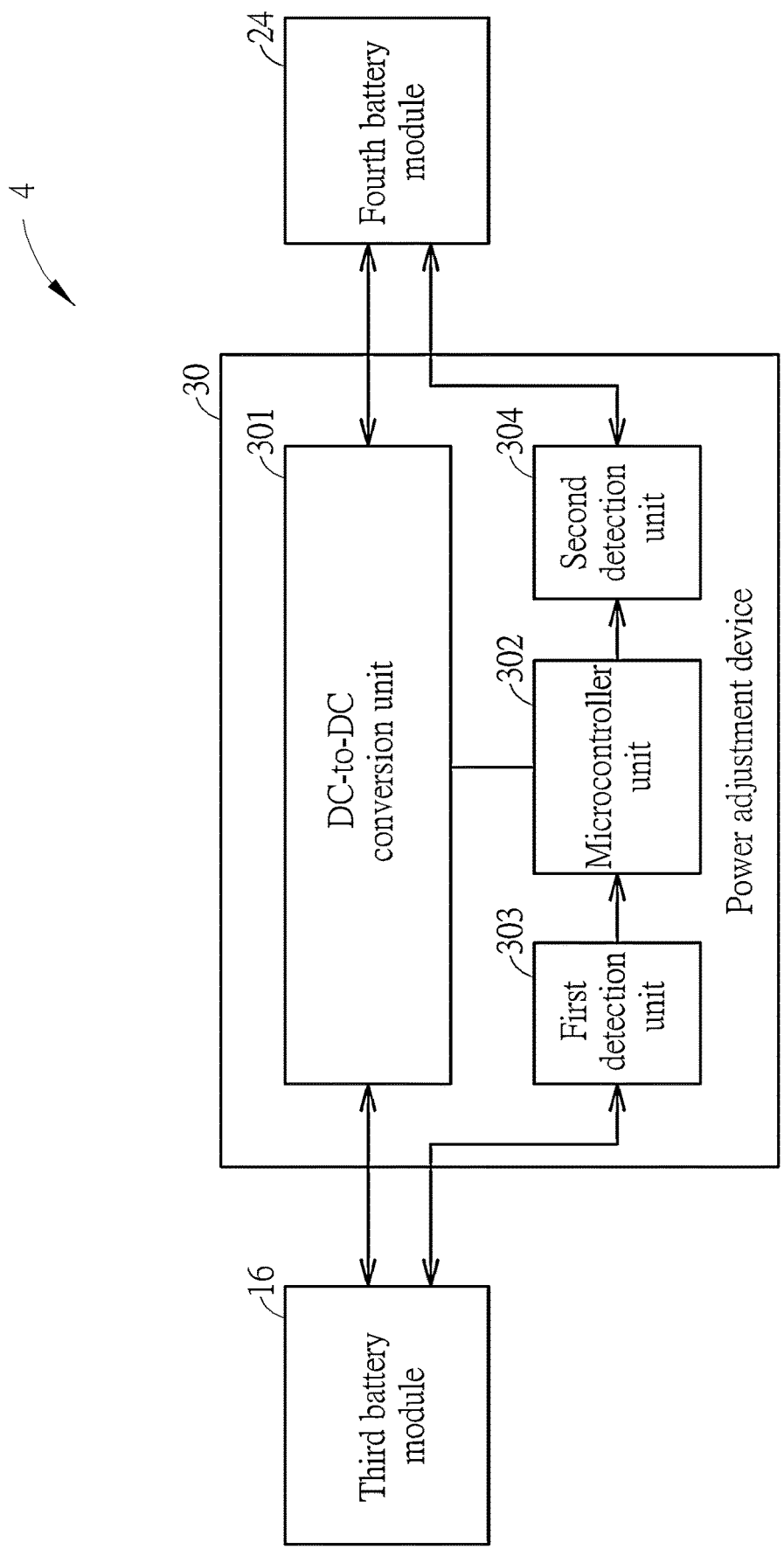
FIG. 4 is a schematic diagram of another charging system according to an embodiment of the present invention.

It should be noted that the power adjustment device 30 of the present invention may also be applied in a scenario where neither the first device 10 nor the second device 20 provides power information. In another embodiment, please refer to FIG. 4, which is a schematic diagram of a charging system 4 according to an embodiment of the present invention. In the charging system 4, the first device 10 may be a third battery module 16, e.g., a power bank that supports a universal serial bus power transfer standard or a fast charging standard, and the second device 20 may be a fourth battery module 24, e.g., a mobile device. In other words, the charging system 4 may be used in a scenario where the power bank and the mobile device are charging and discharging each other via the power adjustment device 30. It should be noted that the third battery module 16 and the fourth battery module 24 may not provide their power information or may not be able to provide sufficient power information to the microcontroller unit 302. Therefore, as shown in FIG. 4, the power adjustment device 30 of the charging system 4 may further include a first detection unit 303 coupled between the third battery module 16 and the microcontroller unit 302 and a first detection unit 303 coupled between the fourth battery module 24 and the microcontroller unit 302. The first detection unit 303 may be configured to detect a first electrical information communicated to the third battery module 16, such as an output power, but is not limited thereto. The second detection unit 304 may be configured to detect a second electrical information of the fourth battery module 24, such as an input power, but not limited thereto. In this way, the microcontroller unit 302 may determine the charging power or the discharging power according to the first power information (output power) and the second power information (input power), and control the charging of the fourth battery module 24 by the third battery module 16, or the charging of the third battery module 16 by the fourth battery module 24. In another embodiment, the third battery module 16 may be an automotive battery module or other battery module with a higher output voltage. For example, the third battery module 16 and the fourth battery module 24 may be a 12V, 24V, 36V, 48V, 72V, or 96V battery module, and the first detection unit 303 detects that the third module 16 has an output voltage between 9.6V and 14.4V, and the second detection unit 304 detects that the output voltage of the fourth module 24 is between 28.8V and 43.2V. The microcontroller unit 302 determines that the third battery module 16 is a 12V battery module and the fourth battery module 24 is a 36V battery module, and controls the DC-to-DC conversion unit 301 to convert the appropriate charging current for the third battery module 16 and the fourth battery module 24 to charge and discharge each other. In short, even if the third battery module 16 and the fourth battery module 24 are not specialized battery modules for electric-assisted bicycles, the power adjustment device 30 may still control the charging and discharging of the third battery module 16 and the fourth battery module 24 with each other, and avoid damage to the third battery module 16 or the fourth battery module 24 caused by unsuitable charging specifications. In addition, it should be noted that, for the third battery module 16 and the fourth battery module 24, the battery capacity may also be different in addition to the output voltage being different.

Figure 5:
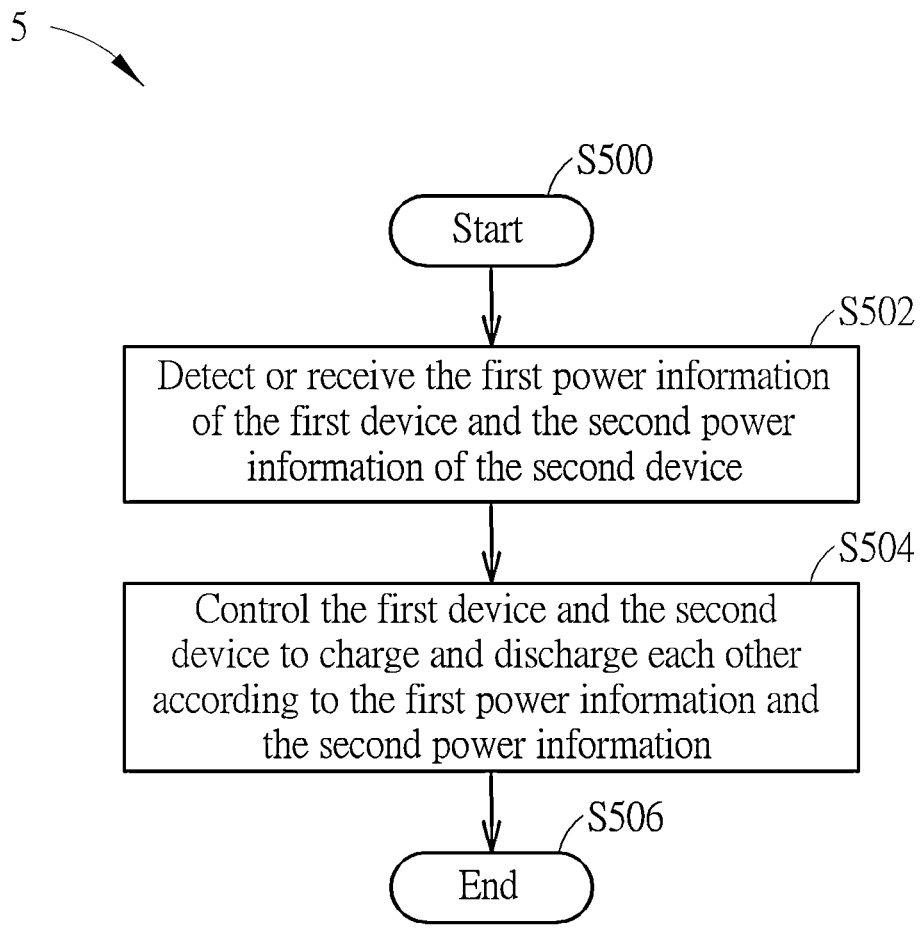
FIG. 5 is a flowchart of a charging method according to an embodiment of the present invention.

The operation of the charging system 1 to 4 may be summarized in a charging method 5 as shown in FIG. 5. The charging method 5 includes the following steps:

Step S500: Start.

Step S502: Detect or receive the first power information of the first device and the second power information of the second device.

Step S504: Control the first device and the second device to charge and discharge each other according to the first power information and the second power information.

Step S506: End.

Detailed descriptions and derived variations of the process 5 may be found in the previous descriptions and will not be repeated here.

Figure 6:
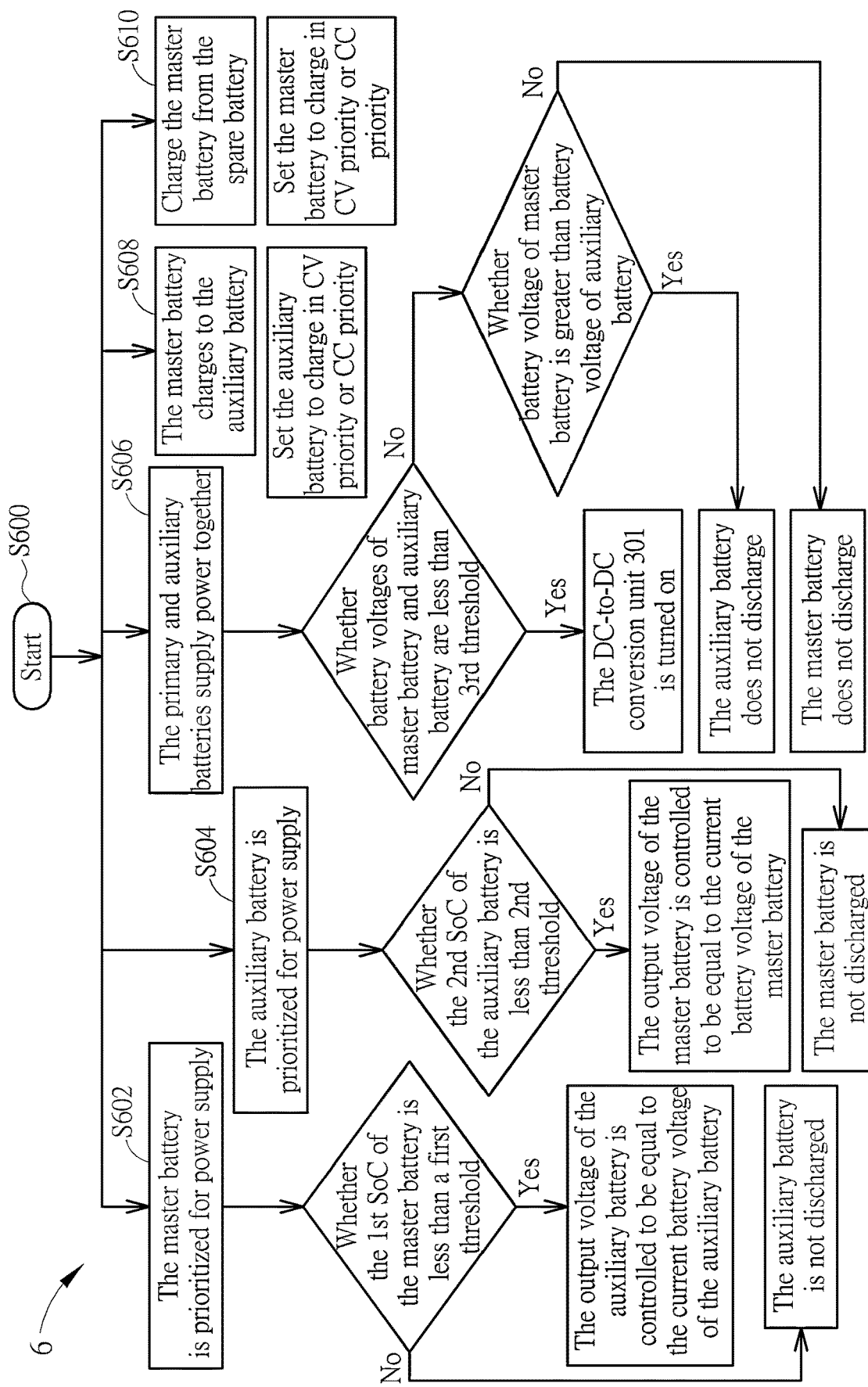
FIG. 6 is a flowchart of another charging method according to an embodiment of the present invention.

It should be noted that the charging systems 1 to 4 are different embodiments of the present invention, and those skilled in the art may make different modifications accordingly, but is not limited thereto. For example, the microcontroller unit 302 may also perform the following functions: controlling the first device 10 or the second device 20 to prioritize the power to the motor of the electric-assisted bicycle; controlling the first device 10 and the second device 20 to simultaneously supply power to the motor of the electric-assisted bicycle; controlling the first device 10 and the second device 20 to prioritize the power to the motor of the electric-assisted bicycle with the higher output voltage of the first device 10 and the second device 20, but is not limited thereto. For example, the microcontroller unit 302 may control the first device 10 and the second device 20 to charge and discharge each other in a constant voltage (CV) priority state, a constant current (CC) priority state, or a constant power (CP) priority state, but not limited thereto. For example, if the first device 10 and the second device 20 are the master battery and the auxiliary battery of the electric-assisted bicycle, respectively, the microcontroller unit 302 may execute a charging method 6, as shown in FIG. 6. The charging method 6 includes the following steps:

Step S600: Start. The user enters the charging command through the user interface.

Step S602: The master battery is prioritized for power supply. The microcontroller unit 302 determines the first state of charge (SoC) of the master battery. When the state of charge of the first battery is less than a first threshold (e.g., 0%), the output voltage of the auxiliary battery is controlled to be equal to the current battery voltage of the auxiliary battery; when the state of charge of the first battery is greater than or equal to the first threshold, the auxiliary battery is not discharged.

Step S604: The auxiliary battery is prioritized for power supply. The microcontroller unit 302 determines the second battery state of charge of the auxiliary battery. When the second battery state of charge is less than or equal to a second threshold value (e.g., 0%), the output voltage of the master battery is controlled to be equal to the current battery voltage of the master battery; when the second battery state of charge is greater than the second threshold value, the master battery is not discharged.

Step S606: The primary and auxiliary batteries supply power together. The microcontroller 302 determines the battery voltage of the master battery and the battery voltage of the auxiliary battery. When the difference between the battery voltages of the master battery and the auxiliary battery is less than a third threshold (for example, 0.5V), the DC-to-DC conversion unit 301 is turned on. When the difference between the battery voltages of the master battery and the auxiliary battery is greater than or equal to the third threshold and the battery voltage of the master battery is greater than the battery voltage of the auxiliary battery, the auxiliary battery does not discharge. When the difference between the battery voltages of the master battery and the auxiliary battery is greater than or equal to the third threshold and the battery voltage of the master battery is greater than or equal to the third threshold, the auxiliary battery does not discharge. When the difference between the battery voltages of the master battery and the auxiliary battery is greater than or equal to the third threshold value and the battery voltage of the master battery is less than or equal to the battery voltage of the auxiliary battery, the master battery does not discharge.

Step S608: The master battery charges to the auxiliary battery. Set the auxiliary battery to charge in constant voltage (CV) priority or constant current (CC) priority.

Step S610: Charge the master battery from the spare battery. Set the master battery to charge in constant voltage (CV) priority or constant current (CC) priority.

Detailed descriptions and the derived variations of the charging method 6 may be found in the previous descriptions and will not be repeated here.

Figure 7:
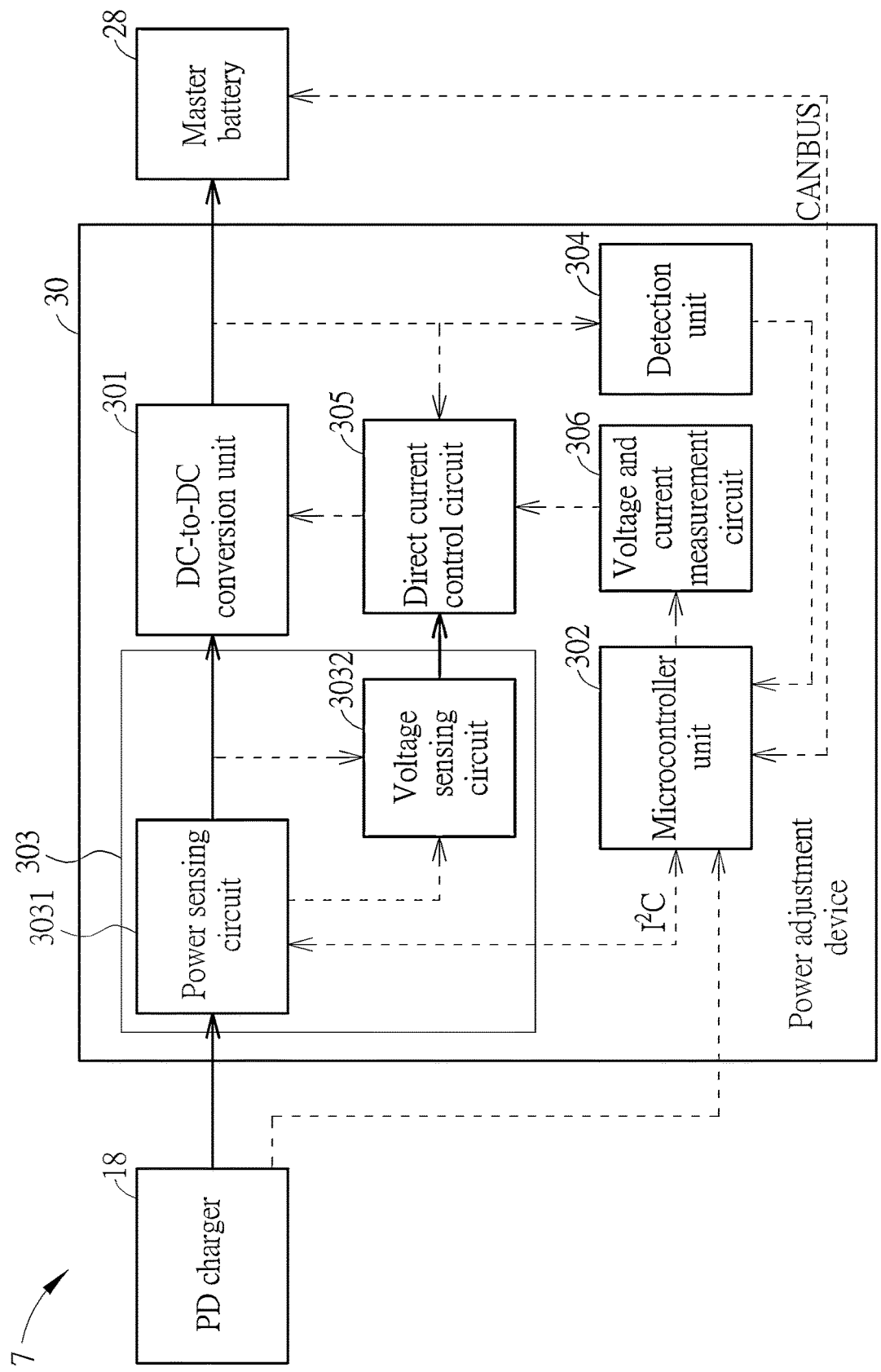
FIG. 7 is a schematic diagram of another charging system according to an embodiment of the present invention.

It should be noted that the charging systems 1 to 4 represent only the necessary components for performing the charging method 5, the basic structure of which is well known in the art and, therefore, will not be repeated, and those skilled in the art may add other components as appropriate according to the needs. For example, as shown in FIG. 7, FIG. 7 is a schematic diagram of the charging system 7 according to an embodiment of the present invention. In the charging system 7, the power adjustment device 30 controls the discharge of a PD charger 18 (10) to charge a master battery 28 (20). The first detection unit 303 includes a power sensing circuit 3031 and a voltage sensing circuit 3032. In addition, the power adjustment device 30 includes a direct current control circuit 305 and a voltage and current measurement circuit 306. Specifically, when the power sensing circuit 3031 detects the PD charger 18, the power sensing circuit 3031 determines and transmits the input power of the PD charger 18 to the master battery 28 (20) via an integrated bus circuit I² C. The power sensing circuit 3031 is then connected to the master battery 28 (20). At the same time, the master battery 28 transmits the power information of the master battery 28 to the microcontroller unit 302 via the CAN BUS of the controller local network, and the microcontroller unit 302 may command the voltage and current control circuits 306 and the direct current control circuit 305 to control the DC-to-DC conversion unit according to the input power of the PD charger 18 and the power information of the master battery 28. The DC-to-DC conversion unit 301 charges the master battery 28 from the PD charger 18. The operation principles of the power sensing circuit 3031, the voltage sensing circuit 3032, the DC control circuit 305, and the voltage and current measurement circuit 306 are well known in the art and are not repeated.

It should be noted that the charging systems 1 to 4 is the embodiment of the present invention. Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (COM) and the computer system. Any of the abovementioned procedures and examples above may be compiled into program codes or instructions that are stored in a storage unit 200. The storage unit 200 may include read-only memory (ROM), flash memory, random access memory (RAM), subscriber identity module (SIM), hard disk, or CD-ROM/DVD-ROM/BD-ROM, but not limited thereto. The microcontroller unit 302 may read and execute the program codes or the instructions stored in the storage unit 200 for realizing the abovementioned functions.

In summary, in the charging system of the present invention, the power adjustment device detects or receives the charging specifications of the first device and the second device, and controls the bidirectional charging and discharging of the first device and the second device with suitable charging specifications to avoid damage to each other. In this way, the charging system of the present invention may support more specifications of charging devices and battery modules than the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging system, comprising:
   a first device;
   a second device; and
   a power adjustment device, wherein the power adjustment device comprises:
      a direct current to direct current (DC-to-DC) conversion unit, coupled to the first device and the second device; and
      a microcontroller unit, coupled to the DC-to-DC conversion unit, the first device, and the second device, is configured to receive a charging command, a first power information of the first device and a second power information of the second device, and to perform the following steps:
         controlling the DC-to-DC conversion unit to convert a first supply current received by the first device into a first charging current to charge the second device according to the first power information and the second power information when the charging command instructs the first device to charge the second device; and
         controlling the DC-to-DC conversion unit to convert a second power supply current received by the second device into a second charging current to charge the first device according to the first power information and the second power information when the charging command instructs the second device to charge the first device;
   wherein the first device is an alternating current to direct current (AC-to-DC) transformer, and the second device is a battery module;
   wherein the power adjustment device further comprises a first detection unit coupled between the AC-to-DC transformer and the DC-to-DC conversion unit, and the first detection unit is configured to detect the first power information; wherein the first power information comprises an output power of the AC-to-DC transformer, and the second power information comprises a battery voltage and a battery current of the battery module.

2. A charging system of claim 1, wherein the AC-to-DC transformer complies with a universal serial bus (USB) power delivery (PD) standard or a quick charge (QC) standard.

3. A power adjustment device, for a first device and a second device, comprising:
- a direct current to direct current (DC-to-DC) conversion unit coupled to the first device and the second device; and
- a microcontroller unit, coupled to the DC-to-DC conversion unit, the first device, and the second device, is configured to receive a charging command, a first power information of the first device, and a second power information of the second device, and to perform the following steps:
  - controlling the DC-to-DC conversion unit to convert a first supply current received by the first device into a first charging current to charge the second device according to the first power information and the second power information when the charging command instructs the first device to charge the second device; and
  - controlling the DC-to-DC conversion unit to convert a second power supply current received by the second device into a second charging current to charge the first device according to the first power information and the second power information when the charging command instructs the second device to charge the first device;
- wherein the first device is an alternating current to direct current (AC-to-DC) transformer, and the second device is a battery module;
- wherein the power adjustment device further comprises a first detection unit coupled between the AC-to-DC transformer and the DC-to-DC conversion unit, and the first detection unit is configured to detect the first power information; wherein the first power information comprises an output power of the AC-to-DC transformer, and the second power information comprises a battery voltage and a battery current of the battery module.

4. A power adjustment device of claim 3, wherein the AC-to-DC transformer device complies with a universal serial bus (USB) power delivery (PD) standard or a quick charge (QC) standard.

* * * * *